(12) United States Patent
Krause et al.

(10) Patent No.: US 7,771,861 B2
(45) Date of Patent: Aug. 10, 2010

(54) METHOD OF USING AN ELECTROCHEMICAL CELL

(75) Inventors: Larry J. Krause, Stillwater, MN (US); Mark N. Obrovac, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 307 days.

(21) Appl. No.: 12/064,966

(22) PCT Filed: Oct. 2, 2006

(86) PCT No.: PCT/US2006/038528
§ 371 (c)(1),
(2), (4) Date: Feb. 27, 2008

(87) PCT Pub. No.: WO2007/044315
PCT Pub. Date: Apr. 19, 2007

(65) Prior Publication Data
US 2008/0311464 A1    Dec. 18, 2008

Related U.S. Application Data

(60) Provisional application No. 60/726,517, filed on Oct. 13, 2005.

(51) Int. Cl.
*H01M 10/44* (2006.01)
(52) U.S. Cl. ........................ 429/50; 429/320
(58) Field of Classification Search .................. 429/50, 429/320
See application file for complete search history.

(56) References Cited

U.S. PATENT DOCUMENTS

| 5,536,599 A | 7/1996 | Alamgir et al. |
| 5,556,721 A | 9/1996 | Sasaki et al. |
| 5,709,968 A | 1/1998 | Shimizu |

(Continued)

FOREIGN PATENT DOCUMENTS

JP    2002-093411    3/2002

(Continued)

OTHER PUBLICATIONS

L.J. Krause et al. "Electronic Conduction in Polyimides", J. Electrochem. Soc., vol. 136, No. 5, 1379-1385 (May 1989).

(Continued)

*Primary Examiner*—Patrick Ryan
*Assistant Examiner*—Brent Thomas
(74) *Attorney, Agent, or Firm*—Stephen F. Wolf

(57) ABSTRACT

The silicon as an anode material for use in lithium ion batteries according to the present invention provides a method for cell manufacturing. The degree to which the silicon is lithiated during cycling can be controlled, thereby lowering the volume expansion while maintaining an acceptable volumetric capacity, and reducing the failure rate of the silicon containing anodes in lithium ion batteries. The crystalline silicon anode is first charged so that the anode becomes partially lithiated. The voltage of the anode during this charging step is typically less than the lithiation potential of crystalline silicon at ambient temperatures, for example, less than 170 mV versus lithium metal. The total number of charge-discharge cycles during conditioning is at least two or more.

20 Claims, 2 Drawing Sheets

U.S. PATENT DOCUMENTS

| | | | |
|---|---|---|---|
| 5,763,119 | A | 6/1998 | Adachi |
| 5,858,573 | A | 1/1999 | Abraham et al. |
| 5,882,812 | A | 3/1999 | Visco et al. |
| 5,900,385 | A | 5/1999 | Dahn et al. |
| 6,004,698 | A | 12/1999 | Richardson et al. |
| 6,045,952 | A | 4/2000 | Kerr et al. |
| 6,235,427 | B1 | 5/2001 | Idota et al. |
| 6,322,928 | B1 | 11/2001 | Thackeray et al. |
| 6,387,570 | B1 | 5/2002 | Nakamura et al. |
| 6,387,571 | B1 | 5/2002 | Lain et al. |
| 6,413,672 | B1 | 7/2002 | Suzuki et al. |
| 6,485,864 | B1 | 11/2002 | Miyazawa et al. |
| 6,680,145 | B2 | 1/2004 | Obrovac et al. |
| 6,780,544 | B2 | 8/2004 | Noh |
| 6,887,511 | B1 | 5/2005 | Shima et al. |
| 2003/0027048 | A1 | 2/2003 | Lu et al. |
| 2003/0108793 | A1 | 6/2003 | Dahn et al. |
| 2004/0058240 | A1 | 3/2004 | Christensen |
| 2004/0121234 | A1 | 6/2004 | Lu |
| 2004/0126659 | A1 | 7/2004 | Graetz et al. |
| 2004/0146734 | A1 | 7/2004 | Miller et al. |
| 2004/0179993 | A1 | 9/2004 | Dahn et al. |
| 2005/0100790 | A1 | 5/2005 | Ota et al. |
| 2005/0112054 | A1 | 5/2005 | Eberman et al. |
| 2005/0170249 | A1 | 8/2005 | Lu et al. |
| 2005/0221196 | A1 | 10/2005 | Dahn et al. |
| 2005/0233213 | A1 | 10/2005 | Lee et al. |
| 2006/0046144 | A1* | 3/2006 | Obrovac ................ 429/231.95 |
| 2006/0099506 | A1 | 5/2006 | Krause et al. |

FOREIGN PATENT DOCUMENTS

| | | |
|---|---|---|
| JP | 2004-281317 | 10/2004 |
| JP | 2004-335272 | 11/2004 |
| KR | 10/20000058189 | 9/2000 |
| KR | 10/20010081928 | 8/2001 |
| KR | 10/20050090218 | 9/2005 |
| WO | WO 01/29920 | 4/2001 |

OTHER PUBLICATIONS

N. Dimov et al. "Mixed Silicon—Graphite Composites as Anode Material for Lithium Ion Batteries Influence of Preparation Conditions on the Properties of the Material", Journal of Power Sources. vol. 136, 108-114 (2004).

PCT Search Report, PCT/US2006/038528.

Pimpa Limthongkul et al. "Electrochemically-driven Solid-state Amorphization in Lithium-metal Anodes", Journal of Power Sources. vol. 119-121, 604-609 (2003).

Product Literature: Department of Applied Chemistry, Saga University, "Silicon/Graphite Composites as an Anode Material for Lithium Ion Batteries" Presented at Polymer Batteries and Fuel Cells $2^{nd}$ International Conference on Jun. 12-17, 2005, 1 page.

\* cited by examiner

METHOD OF USING AN ELECTROCHEMICAL CELL

CROSS REFERENCE TO RELATED APPLICATIONS

This application is a national stage filing under 35 U.S.C. 371 of PCT/US2006/038528 filed Oct. 2, 2006, which claims priority to U.S. Provisional Application No. 60/726,517; filed Oct. 13, 2005, they disclosure of which is incorporated by reference in its entirety herein.

BACKGROUND

Lithium ion batteries generally have an anode, cathode, and electrolyte. Graphite-based anodes have been used in lithium ion batteries. Silicon has nearly three times the theoretical volumetric capacity for lithium metal as compared to graphite; hence, silicon is an attractive anode material for use in lithium ion batteries. However, the volumetric expansion of silicon when it is fully lithiated is typically too large to be tolerated by the conventional binder materials used to make composite electrodes, leading to failure of the anode during cycling of the electrochemical cell.

SUMMARY

In one aspect, the present invention provides a method of using an electrochemical cell, the method comprising the sequential steps:
a) providing a electrochemical cell, the electrochemical cell comprising:
an unconditioned anode comprising crystalline silicon, a cathode, and
electrolyte;
b) charging the electrochemical cell such that the silicon anode reaches a voltage below the lithiation potential of crystalline silicon;
c) at least partially discharging the electrochemical cell; and
d) repeating steps b) and c) at least once; and
e) operating the electrochemical cell such that the conditioned anode potential is maintained above the lithiation potential of crystalline silicon.

In one embodiment, steps a) through e) are consecutive.

In one embodiment, the electrochemical cell is fully discharged in at least one of steps c) or d).

In some embodiments, the maximum level of lithiation of the silicon anode may be maintained substantially constant during repeated steps b).

In another aspect, the present invention provides a method of using an electrochemical cell, the method comprising the sequential steps:
a) providing a electrochemical cell, the electrochemical cell comprising:
a conditioned anode comprising crystalline silicon, the anode prepared by a process comprising the sequential steps of:
i) conditioning the silicon anode such that it reaches a voltage below the lithiation potential of crystalline silicon,
ii) at least partially discharging the electrochemical cell; and
iii) repeating steps i) and ii) at least once;
a cathode, and
electrolyte; and b) operating the electrochemical cell such that the conditioned anode potential is maintained above the lithiation potential of crystalline silicon.

In some embodiments, the maximum level of lithiation of the silicon anode may be maintained substantially constant during repeated steps ii).

According to the present invention the degree to which the silicon is lithiated (that is, accumulates lithium) during cycling can be controlled, thereby lowering the volume expansion while maintaining an acceptable volumetric capacity, and reducing the failure rate of the silicon containing anodes in lithium ion batteries.

The following definitions apply throughout the specification and claims:

The term "anode" refers to the electrode where electrochemical oxidation occurs during the discharging process (that is, during discharging, the anode undergoes delithiation, and during charging, lithium atoms are added to this electrode).

The term "cathode" refers to the electrode where electrochemical reduction occurs during the discharging process (that is, during discharging, the cathode undergoes lithiation, and during charging, lithium atoms are removed from this electrode).

The term "charging" refers to a process of providing electrical energy to an electrochemical cell.

The term "conditioning" refers to the initial cycles of controlled lithiation and delithiation of the anode. The conditioning steps prepare a cell for general use. After undergoing the conditioning cycles a cell may be used to reversibly store and supply electrical energy.

The term "discharging" refers to a process of removing electrical energy from an electrochemical cell (that is, discharging is a process of using the electrochemical cell to do useful work).

The term "lithiation" refers to the process of inserting lithium into an active electrode material in an electrochemical cell. During the lithiation process an electrode undergoes electrochemical reduction; the term "delithiation" refers to the process of removing lithium from an active electrode material in an electrochemical cell. During the delithiation process an electrode undergoes electrochemical oxidation.

The term "lithium ion electrochemical cell" refers to an electrochemical cell in which the anode and cathode are lithiated/delithiated during cell cycling, but no lithium metal is present in the cell.

The term "lithiation potential" refers to the potential at which lithiation of crystalline silicon occurs.

DETAILED DESCRIPTION

Figure 1:
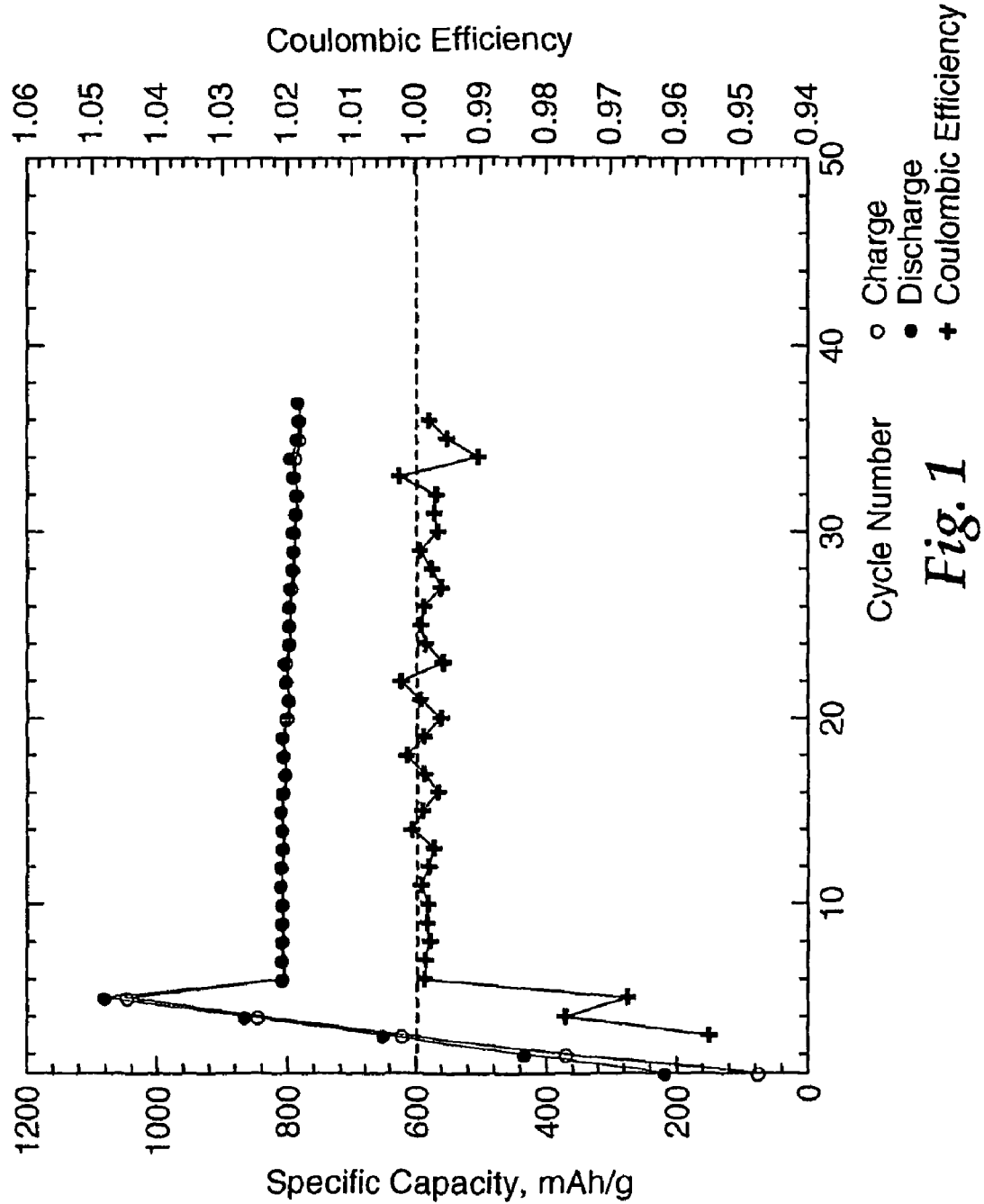
FIG. 1 is a graph of specific a capacity and coulombic efficiency versus cycle number of a cell prepared according to Example 1.

Electrochemical cells conditioned according to the present invention contain an anode that comprises silicon, a cathode and electrolyte. The anodes and cathodes according to the present invention may also contain a current collector, an adhesion promoter and a binder. The electrolyte can be liquid or solid.

Electrochemical cells according to the present invention may further comprise a housing, for example, as would typically be the case of a lithium polymer battery. Such constructions are well known, and may be found for example, in U.S. Pat. No. 6,322,928 (Thackeray et al.).

The anode typically comprises a plurality of silicon particles (for example, silicon powder), although other forms of silicon (for example, larger particles, wires, or plates) may also be used. Accordingly, in the interest of clarity, the following discussion is directed at silicon particles; however, it will be recognized that the discussion also applies to such other forms of silicon unless specifically noted.

Prior to conditioning, the silicon particles are typically crystalline, but after conditioning according to the present invention the particles typically comprise a crystalline silicon phase and an amorphous silicon phase that may contain lithium. The crystalline silicon particles (that is, unconditioned silicon particles) typically have an average particle size in a range of from 0.5 to 50 micrometers, although this is not a requirement.

Conditioned anodes typically comprise at least 70 percent by weight of silicon particles, for example, at least 80 percent by weight of these particles, based on the total weight of the anode, although other percentages may also be used.

The anode typically further comprises an electrically conductive diluent dispersed in a polymer binder. Exemplary electrically conductive diluents include carbon blacks, flake graphite, metal, metal nitrides, metal carbides, metal silicides, metal borides, and combinations thereof. For example, representative electrically conductive high surface carbon diluents include carbon blacks such as those available under the trade designations "SUPER P" and "SUPER S" from MMM Carbon, Belgium, under the trade designation "SHAWANIGAN BLACK" from Chevron Chemical Co., Houston, Tex., acetylene black, furnace black, lamp black, graphite, carbon fibers and combinations thereof.

The silicon particles and conductive diluent are typically dispersed in a polymeric binder. Exemplary polymeric binders include polyimides. Typically, polyimides may be prepared via a condensation reaction between a dianhydride and a diamine in an aprotic polar solvent such as N-methylpyrrolidinone. This reaction leads to the formation of a polyamic acid, and subsequent chemical or thermal cyclization leads to the polyimide. A variety of suitable polyimides are described in commonly-assigned co-pending U.S. patent application Ser. No. 11/218,448, entitled "Polyimide Electrode Binders", filed Sep. 1, 2005 (Krause et al.).

The polyimide may be capable of electrochemical charge transport when evaluated as described by L. J. Krause et al. in "Electronic Conduction in Polyimides", *J. E. Electrochem. Soc.*, Vol. 136, No. 5, May 1989.

The anode composition may optionally include an adhesion promoter that promotes adhesion of the silicon particles or electrically conductive diluent to the polymeric binder. The combination of an adhesion promoter and a polyimide binder may help the binder better accommodate volume changes that may occur in the powdered material during repeated lithiation/delithiation cycles.

If used, an optional adhesion promoter may be added to the electrically conductive diluent, and/or may form part of the binder (for example, in the form of a functional group), and/or or may be in the form of a coating applied to the surface of the silicon particles. Examples of materials for the latter are well known, and include silanes, titanates, and phosphonates. Examples of useful silanes include vinyltriethoxysilane, vinyltrimethoxysilane, vinyltrichlorosilane, vinyltris(2-methoxyethoxy)silane, γ-methacryloxypropyltrimethoxysilane, γ-methacryloxypropyltriethoxysilane, γ-aminopropyltriethoxysilane, γ-aminopropyltrimethoxysilane, N-β-(aminoethyl)-γ-aminopropyltrimethoxysilane, N-β-(aminoethyl)-γ-aminopropyltriethoxysilane, γ-ureidopropyltriethoxysilane, γ-ureidopropyltrimethoxysilane, β-(3,4-epoxycyclohexyl)ethyltrimethoxysilane, β-(3,4-epoxycyclohexyl)ethyltriethoxysilane, γ-glycidoxypropyltrimethoxysilane, γ-glycidoxypropyltriethoxysilane, γ-mercaptopropyltrimethoxysilane, γ-mercaptopropylmethoxysilane, γ-chloropropyltrimethoxysilane, γ-chloropropyltriethoxysilane, methyltriethoxysilane, methyltrimethoxysilane, phenyltriethoxysilane and phenyltrimethoxysilane. Examples of useful titanates include titanium N-(triethanolaminato)isopropoxide and those commercially available from E. I. du Pont de Nemours and Company, Wilmington, Del., under the trade designation "TYZOR". Additional examples include isopropyl tris(isostearoyl) titanate, isopropyl tris(dodecylbenzenesulfonyl) titanate, isopropyl tris(dioctylpyrophosphato) titanate, tetraisopropyl bis(dioctylphosphito) titanate, tetraoctyl bis(ditridecylphosphito) titanate, tetra(2,2-diallyloxymethyl) bis(ditridecylphosphito) titanate, bis(dioctylpyrophosphato oxyacetate titanate, bis(dioctylpyrophosphato)ethylene titanate, isopropyl trioctanoyl titanate, isopropyl dimethacryl isostearoyl titanate, isopropyl isostearoyl diacryl titanate, isopropyl tris(dioctylphosphato) titanate, isopropyltricumylphenyl titanate, isopropyltri(N-aminoethyl) titanate, dicumyl phenyl oxyacetate titanate, and diisostearoyl ethylene titanate. Examples of useful phosphonates include 1-hydroxyethylene-1,1-diphosphonic acid. Also useful are adhesion promoters such as those described in U.S. Publ. Pat. Appl. No. 2004/0058240 A1 (Christensen).

If an adhesion promoter is included as a coating for the silicon particles, it is typically present in an amount ranging from 0.1 to 20 parts per 100 parts by weight of the silicon particles, and more typically between 1 and 10 parts per 100 parts by weight of the silicon particles. The coating may fully or partially cover the surface of the particles.

Any lithium-containing material or alloy can be used as the cathode material in the batteries according to the present invention. Examples of suitable cathode compositions for liquid electrolyte-containing batteries include $LiCoO_2$, $LiCo_{0.2}Ni_{0.8}O_2$, and $Li_{1.07}Mn_{1.93}O_4$. Examples of suitable cathode compositions for solid electrolyte-containing batteries include $LiV_3O_8$, $LiV_2O$, $LiV_3O_{13}$, and $LiMnO_2$. Other examples of cathode compositions useful in the batteries according to the present invention can be found in U.S. Publ. Pat. Appln. Nos. 2003/0027048 A1 (Lu et al.); 2005/0170249 A1 (Lu et al.); 2004/0121234 A1 (Lu); 2003/0108793 A1 (Dahn et al.); 2005/0112054 A1 (Eberman et al.); 2004/0179993 A1 (Dahn et al.); and U.S. Pat. Nos. 6,680,145 B1 (Obrovac et al.); and 5,900,385 A1 (Dahn et al.).

Useful electrolytes typically contain one or more lithium salts and a charge carrying medium in the form of a solid, liquid or gel. Exemplary lithium salts are stable in the electrochemical window and temperature range (for example from −30° C. to 70° C.) within which the cell electrodes may operate, are soluble in the chosen charge-carrying media, and perform well in the chosen lithium-ion cell. Exemplary lithium salts include $LiPF_6$, $LiBF_4$, $LiClO_4$, lithium bis(oxalato)borate, $LiN(CF_3SO_2)_2$, $LiN(C_2F_5SO_2)_2$, $LiAsF_6$, $LiC(CF_3SO_2)_3$, combinations thereof and other lithium salts that will be familiar to those skilled in the art.

Exemplary charge carrying media are stable without freezing or boiling in the electrochemical window and temperature range within which the cell electrodes may operate, are capable of solubilizing sufficient quantities of the lithium salt so that a suitable quantity of charge can be transported from the positive electrode to the negative electrode, and perform well in the chosen lithium-ion cell.

Useful solid charge carrying media include polymeric media such as, for example, polyethylene oxide.

Exemplary liquid charge carrying media include ethylene carbonate, propylene carbonate, dimethyl carbonate, diethyl carbonate, ethyl-methyl carbonate, butylene carbonate, vinylene carbonate, fluorinated ethylene carbonate, fluorinated propylene carbonate, γ-butyrolactone, methyl difluoroacetate, ethyl difluoroacetate, dimethoxyethane, diglyme (that is, bis(2-methoxyethyl)ether), tetrahydrofuran, dioxolane, combinations thereof and other media that will be familiar to those skilled in the art. Exemplary charge carrying media gels include those described in U.S. Pat. Nos. 6,387,570 (Nakamura et al.) and 6,780,544 (Noh).

The charge carrying media solubilizing power may be improved through addition of a suitable cosolvent. Exemplary cosolvents include aromatic materials compatible with Li-ion cells containing the chosen electrolyte. Representative cosolvents include toluene, sulfolane, dimethoxyethane, combinations thereof and other cosolvents that will be familiar to those skilled in the art.

The electrolyte may include other additives that will be familiar to those skilled in the art. For example, the electrolyte may contain a redox chemical shuttle such as those described in U.S. Pat. Nos. 5,709,968 (Shimizu), 5,763,119 (Adachi), 5,536,599 (Alamgir et al.), 5,858,573 (Abraham et al.), 5,882,812 (Visco et al.), 6,004,698 (Richardson et al. '698), 6,045,952 (Kerr et al.), and 6,387,571 B1 (Lain et al.); in U.S. patent application Ser. No. 11/094,927, filed Mar. 31, 2005 entitled, "Redox Shuttle for Rechargeable Lithium-ion Cell, and in PCT Published Patent Application No. WO 01/29920 A1 (Richardson et al. '920).

A current collector may be used in combination with one or both of the anode and cathode. Examples of suitable materials for the electrically conductive current collector include metals such as copper, chromium, nickel, silver, and combinations thereof.

Cycling a crystalline silicon anode between fixed voltage limits without preconditioning generally causes the crystalline silicon anode to become progressively more lithiated. Without wishing to be bound by theory, we believe that during lithiation/delithiation cycling amorphous silicon forms on the surface of the crystalline silicon particles. Further lithiation results in the thickening of this surface. Through careful electrochemical measurements, we have found that the voltage at which the initial lithiation of crystalline silicon takes place is less than 170 mV versus lithium metal at 23° C.

According to the present invention, silicon particles are conditioned such that they comprise an amorphous phase, which may contain lithium, and a crystalline phase. This two-phase structure is formed by cycling a crystalline silicon anode through a prescribed conditioning cycling protocol. After the completion of the conditioning cycles further lithiation of the crystalline silicon phase is impeded or does not occur at all during subsequent cycles within fixed voltage limits where the voltage is maintained above the lithiation potential of crystalline silicon, and the two-phase structure is maintained.

Conditioned silicon-containing anodes according to the present invention may be produced in situ in an electrochemical cell by conditioning using the following method:

1) A lithium ion electrochemical cell comprising a crystalline silicon anode is first charged so that the anode becomes partially lithiated. The voltage of the anode during this charging step is typically less than the lithiation potential of crystalline silicon at ambient temperatures, for example, less than 170 mV vs. metallic Li at 23° C.

2) The lithium ion electrochemical cell is then at least partially discharged.

3) Further conditioning cycles of charging followed by discharging during which the anode voltage drops below the lithiation potential of crystalline silicon (for example, below about 170 mV vs. metallic Li at 23° C.) may be performed, for example, until a desired amount of crystalline silicon has been converted to amorphous silicon. During subsequent charge-discharge cycles the anode voltage may be maintained at or above 170 mV, 175 mV, or even at or above 180 mV, relative to lithium metal at 23° C. In this way, the further lithiation of crystalline silicon is impeded or does not occur at all, and the relative amount of the amorphous silicon phase and crystalline silicon phase is maintained.

The total number of charge-discharge cycles during conditioning is at least two, but may be at least 3, 4, 5, 6, 7 or more.

After conditioning, the electrochemical cell can be operated above the lithiation potential of crystalline silicon with little or no further lithiation of the remaining crystalline silicon Objects and advantages according to the present invention are further illustrated by the following non-limiting examples, but the particular materials and amounts thereof recited in these examples, as well as other conditions and, details, should not be construed to unduly limit this invention.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

In the examples: "mAh/g" means millampere-hours per gram; "mA/g" means milliamperes per gram; "g" means gram(s); and "mV" means millivolts.

Electrochemical cycling in Examples 1 through 3 was carried out at an ambient temperature of 23° C.

Preparatory Example 1

4,4'-Oxydianiline (3 g, 0.015 moles) was added to 44.4 grams of N-methylpyrrolidinone (freshly distilled from $CaH_2$) in a round-bottomed vessel. 3,3',4,4'-Benzophenonetetracarboxylic dianhydride (4.83 g) was added to the reaction mixture. The solution was allowed to stir under dry nitrogen overnight to form an aromatic polyimide precursor solution (BTDA-ODA solution).

Example 1

A composite silicon electrode was made by the following method. 1.7 g Si powder (1-20 micrometer, 99.985% purity, obtained from Alfa Aesar, Ward Hill, Mass.), 0.255 g of carbon black (obtained under the trade designation "SUPER P" from MMM Carbon, Belgium), 1.133 g of the BTDA-ODA solution of Preparatory Example 1 and 4.5 g of N-methylpyrrolidinone (that is, NM) were added to a 45 ml tungsten carbide milling vessel (Fritsch no. 50.708.00) with two 0.5-inch (1.3-cm) and ten 0.25-inch (0.64-cm) tungsten carbide balls. The grinding bowl was loaded into a planetary mill (available from Fritsch GmbH, D-55743 Idar-Oberstein, Germany under the trade designation "PLANETARY MICRO MILL PULVERISETTE 7") and milled for one hour at a speed setting of 8. After milling, the slurry was then coated onto nickel foil using a 5-mil gap notch bar. The coating was dried at 75° C. for 1 hour and then heat treated in air at 200° C. for 1 hour, and then at 250° C. for 1 hour. Circular electrodes (area=2 cm$^2$) were then punched from the electrode. Coin cells (type 2325) were constructed using metallic lithium as the counter electrode and a 30-micrometer thick polypropylene separator. The electrolyte was one molar LiPF$_6$ in an ethylene carbonate (EC)/diethyl carbonate (DEC) mixture (1:2 volume/volume). The cells were tested on a cell cycler obtained under the trade designation "MACCOR SERIES 2000 BATTERY TEST SYSTEM" from Maccor, Inc., Tulsa, Okla. One of these cells was cycled according to the protocol in Table 1 (below).

TABLE 1

| Cycle Number | | Cycling Current, microamperes | Trickle Current, microamperes | Upper Voltage Cutoff, mV | Lower Voltage Cutoff, mV | Discharge Capacity Cutoff, mAh/g |
|---|---|---|---|---|---|---|
| 1 | L | 162 | none | | none | 215 |
| | D | 162 | | 900 | | |
| 2 | L | 162 | none | | none | 572 |
| | D | 162 | | 900 | | |
| 3 | L | 162 | none | | none | 853 |
| | D | 162 | | 900 | | |
| 4 | L | 162 | none | | none | 1097 |
| | D | 162 | | 900 | | |
| 5 | L | 162 | none | | none | 1333 |
| | D | 377 | | 900 | | |
| 6 | L | 377 | 22 | | 170 | none |
| | D | 377 | | 900 | | |
| 7 | L | 377 | 22 | | 170 | none |
| | D | 377 | | 900 | | |

In Table 1 (above), "L" means that the silicon electrode was undergoing lithiation, and "D" indicates that the silicon electrode was undergoing delithiation.

The first four cycles of the cell were conditioned by cycling to a fixed lithiation capacity. During these conditioning cycles the voltage of the silicon electrode was exposed to voltages less than 170 mV, causing some of the silicon to become lithiated. After the first four cycles the cells were cycled to a lower voltage cutoff of 170 mV. FIG. 1 shows plots of specific capacity and coulombic efficiency as a function of the number of lithiation/delithiation cycles versus cycle number for the cell. After the first four cycles the specific capacity (charge or discharge) of the cell did not increase, indicating that no new silicon is being lithiated after the first five cycles and that the two-phase structure of the particles is being maintained.

Example 2

Figure 2:
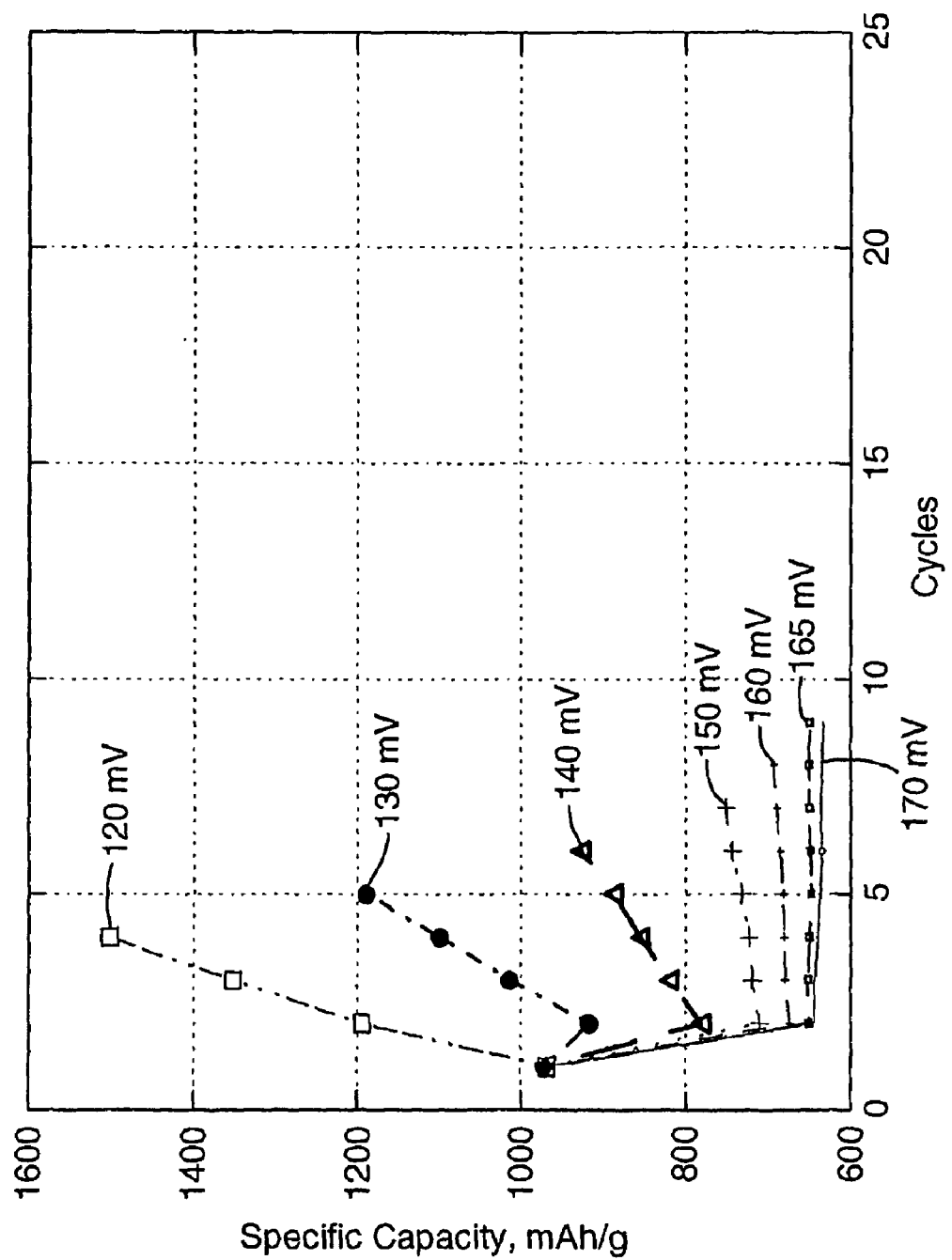
FIG. 2 is a graph of specific capacity for Si-containing electrodes cycled to various cutoff voltages according to Example 2.

Silicon-containing electrodes were prepared by combining 1.7 g of elemental silicon, 0.255 g of Super P (conductive diluent) and 1.133 g of a 15 percent by weight solution of polyimide binder in NMP. The polyimide was formed from the condensation of 3,3',4,4'-benzophenonetetracarboxylic dianhydride with oxydianiline in NMP. An additional 3-4 grams of NMP was added to the slurry, and then the mixture was placed in a tungsten carbide can and milled in the a planetary mill (as in Example 1, setting No. 3) for 1 hour. The slurry was then coated onto nickel foil using a 5-mil gap notch bar. The coating was dried at 75° C. for 1 hour and then heat treated in air at 200° C. for 1 hour, and then at 250° C. for 1 hour. The electrode composition was 80 percent by weight Si, 12 percent by weight conductive diluent and 8 percent by weight polyimide. Circular electrodes (area=2 cm$^2$) were then punched from the electrode and coin cells (Type 2325) were constructed using metallic lithium as the counter electrode and a 30-micrometer thick polypropylene separator. The electrolyte was one molar LiPF$_6$ in EC/DEC mixture (1:2 volume/volume). All the cells were initially lithiated to 1200 mAh/g at 150 mA/g and then delithiated to 0.9 volts versus lithium metal at 150 mA/g. After this first cycle each cell was lithiated at 150 mA/g to a different cutoff voltage. The current was allowed to trickle to 30 mA/g at the respective voltages. Specific capacity of these cells, measured as a function of the number of lithiation/delithiation cycles, was measured at different cutoff voltages ranging from 120 mV to 170 mV, and is reported in FIG. 2. FIG. 2 shows that at cutoff voltages lower than 170 mV versus lithium metal at 23° C. are not stable and produce increasing capacity at every cycle.

Example 3

Coin cells with a silicon electrode and a lithium counter electrode as constructed as in Example 2 were cycled according to the protocol in Table 2. During the conditioning cycles the cells were cycled at constant voltage with a limiting current of 1.1 A/g. A capacity cutoff was used during conditioning (cycles 1 through 10) such that the full lithiation level of silicon was the same as that of the initial lithiation cycle. Also, during the conditioning cycles 2 through 10 the anode was only partially delithiated. After the conditioning cycles the cell was cycled at fixed voltage limits between 900 mV and 170 mV at a constant current of 130 mA/g with a 13 mA/g trickle at the 170 mV cutoff. During this regular cycling, the lithiation level of the anode at full lithiation was only about 50 mAh/g less than the maximum lithiation level achieved during the initial lithiation cycle. Furthermore, during regular cycling the specific capacity (charge or discharge) of the cell did not increase, indicating that no new silicon is being lithiated during regular cycling and that the two-phase structure of the particles is being maintained.

TABLE 2

| Cycle Number | Constant Current (mA/g) | Constant Voltage (mV) | Trickle Current (mA/g) | Limiting Current (A/g) | Upper Voltage Cutoff (mV) | Lower Voltage Cutoff (mV) | Capacity Cutoff (mAh/g) |
|---|---|---|---|---|---|---|---|
| L1 | | 80 | | 1.1 | | | 1600 |
| D1 | | 900 | 22 | 1.1 | 900 | | |
| L2 | | 80 | | 1.1 | | | 1346 |
| D2-10 | | 900 | | 1.1 | 900 | | 650 |
| L2-10 | | 80 | | 1.1 | | | 650 |
| D11+ | 130 | | | | 900 | | |
| L11+ | 130 | | 13 | | | 170 | |

In Table 2 (above), "L" means that the silicon electrode was undergoing lithiation, and "D" indicates that the silicon electrode was undergoing delithiation.

Various modifications and alterations of this invention may be made by those skilled in the art without departing from the scope and spirit of this invention, and it should be understood that this invention is not to be unduly limited to the illustrative embodiments set forth herein.

What is claimed is:

1. A method of using an electrochemical cell, the method comprising the sequential steps:
    a) providing a electrochemical cell, the electrochemical cell comprising:
        an unconditioned anode comprising crystalline silicon,
        a cathode, and
        electrolyte;
    b) charging the electrochemical cell such that the silicon anode reaches a voltage below lithiation potential of crystalline silicon;
    c) at least partially discharging the electrochemical cell; and
    d) repeating steps b) and c) at least once; and,
    e) operating the electrochemical cell such that the conditioned anode potential is maintained above the lithiation potential of crystalline silicon.

2. A method according to claim 1, wherein steps b) and c) are repeated at least 4 times.

3. A method according to claim 1, wherein the anode further comprises a polymeric binder and a conductive diluent.

4. A method according to claim 1, wherein the polymeric binder comprises polyimide.

5. A method according to claim 1, wherein the conductive diluent comprises high surface carbon.

6. A method according to claim 1, wherein the electrochemical cell is partially discharged in at least one of steps c) or d).

7. A method according to claim 1, wherein the anode comprises a plurality of crystalline silicon particles.

8. A method according to claim 7, wherein the crystalline silicon particles have an average particle size in a range of from 0.5 to 50 micrometers.

9. A method according to claim 1, wherein the cathode comprises lithium.

10. A method according to claim 1, wherein the electrolyte comprises at least one of fluorinated ethylene carbonate, vinylene carbonate, polyethylene oxide, lithium hexafluorophosphate, or a combination thereof.

11. A method according to claim 1, wherein electrochemical cell is operated with an anode potential of 170 mV or greater versus lithium metal.

12. A method of using an electrochemical cell, the method comprising the sequential steps:
    a) providing a electrochemical cell, the electrochemical cell comprising:
        a conditioned anode comprising crystalline silicon, the anode prepared by a process comprising the sequential step:
            i) conditioning the silicon anode such that it reaches a voltage below lithiation potential of crystalline silicon;
            ii) at least partially discharging the electrochemical cell; and
            iii) repeating steps i) and ii) at least once;
        a cathode, and
        electrolyte; and
    b) operating the electrochemical cell such that the conditioned anode potential is maintained above the lithiation potential of crystalline silicon.

13. A method according to claim 12, wherein steps i) and ii) are repeated at least 4 times.

14. A method according to claim 12, wherein the anode further comprises a polymeric binder and a conductive diluent.

15. A method according to claim 12, wherein the polymeric binder comprises polyimide.

16. A method according to claim 12, wherein the anode comprises a plurality of crystalline silicon particles.

17. A method according to claim 16, wherein the crystalline silicon particles have an average particle size in a range of from 0.5 to 50 micrometers.

18. A method according to claim 12, wherein the cathode comprises lithium.

19. A method according to claim 12, wherein the electrolyte comprises at least one of fluorinated ethylene carbonate, vinylene carbonate, polyethylene oxide, lithium hexafluorophosphate, or a combination thereof.

20. A method according to claim 12, wherein the electrochemical cell is operated with an anode potential of 170 mV or greater versus lithium metal.

* * * * *

UNITED STATES PATENT AND TRADEMARK OFFICE
CERTIFICATE OF CORRECTION

PATENT NO. : 7,771,861 B2  
APPLICATION NO. : 12/064966  
DATED : August 10, 2010  
INVENTOR(S) : Larry J. Krause et al.

It is certified that error appears in the above-identified patent and that said Letters Patent is hereby corrected as shown below:

Column 1,
Line 10, delete "they" and insert --the-- therefor.

Column 1,
Line 62, delete "silicon," and insert --silicon;-- therefor.

Column 6,
Line 61, delete "NM)" and insert --NMP)-- therefor.

Column 10,
Line 10, Claim 12, delete "step:" and insert --steps of:-- therefor.

Signed and Sealed this
Eighth Day of November, 2011

David J. Kappos
*Director of the United States Patent and Trademark Office*